Jan. 24, 1950
A. WALSH
2,495,557
FLOOR CONSTRUCTION OF ROAD VEHICLES
Filed Oct. 2, 1947
2 Sheets-Sheet 1
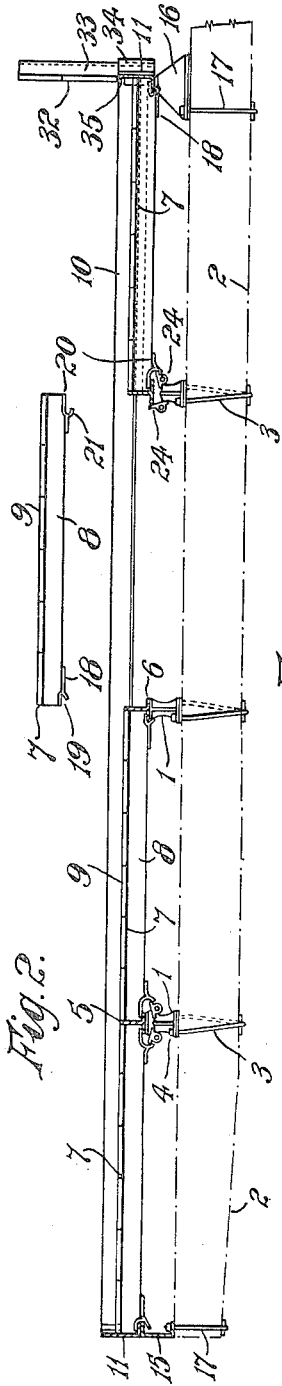
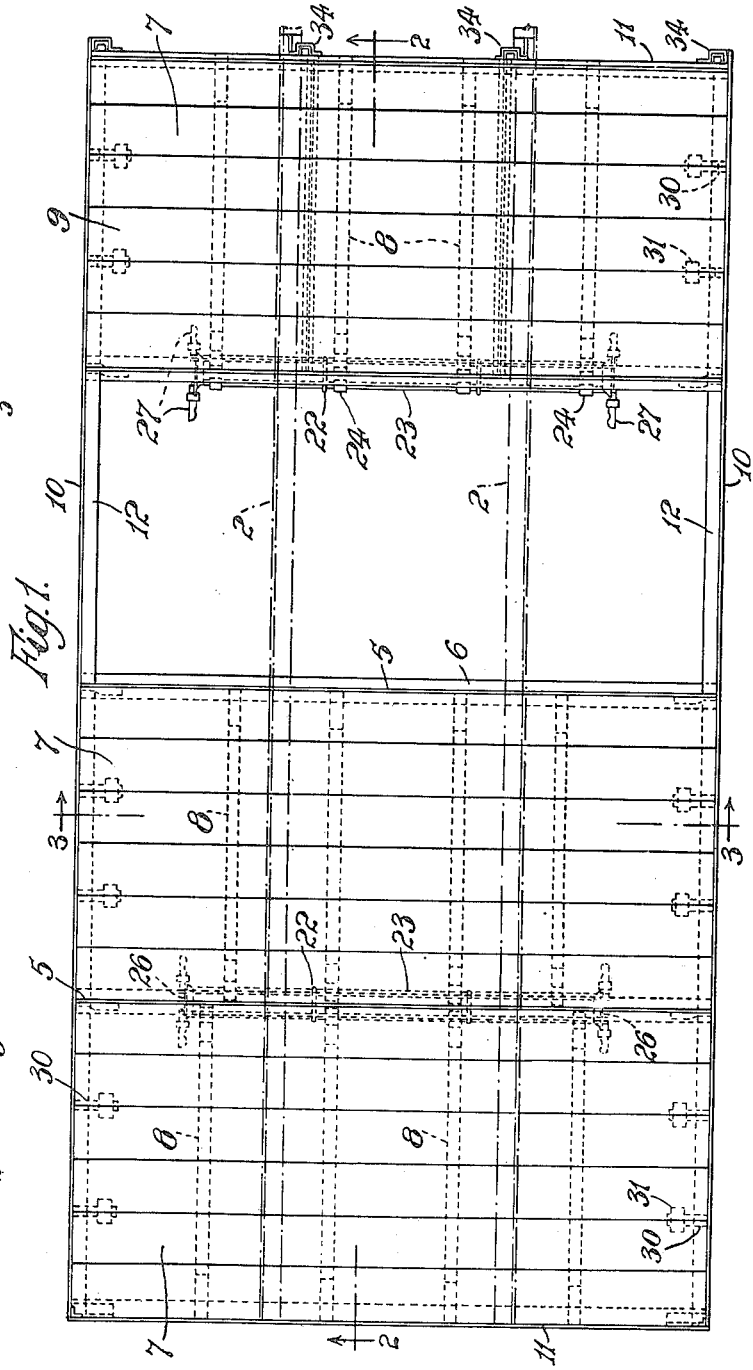
INVENTOR
Arthur Walsh
By his Attorney
A. J. Davies

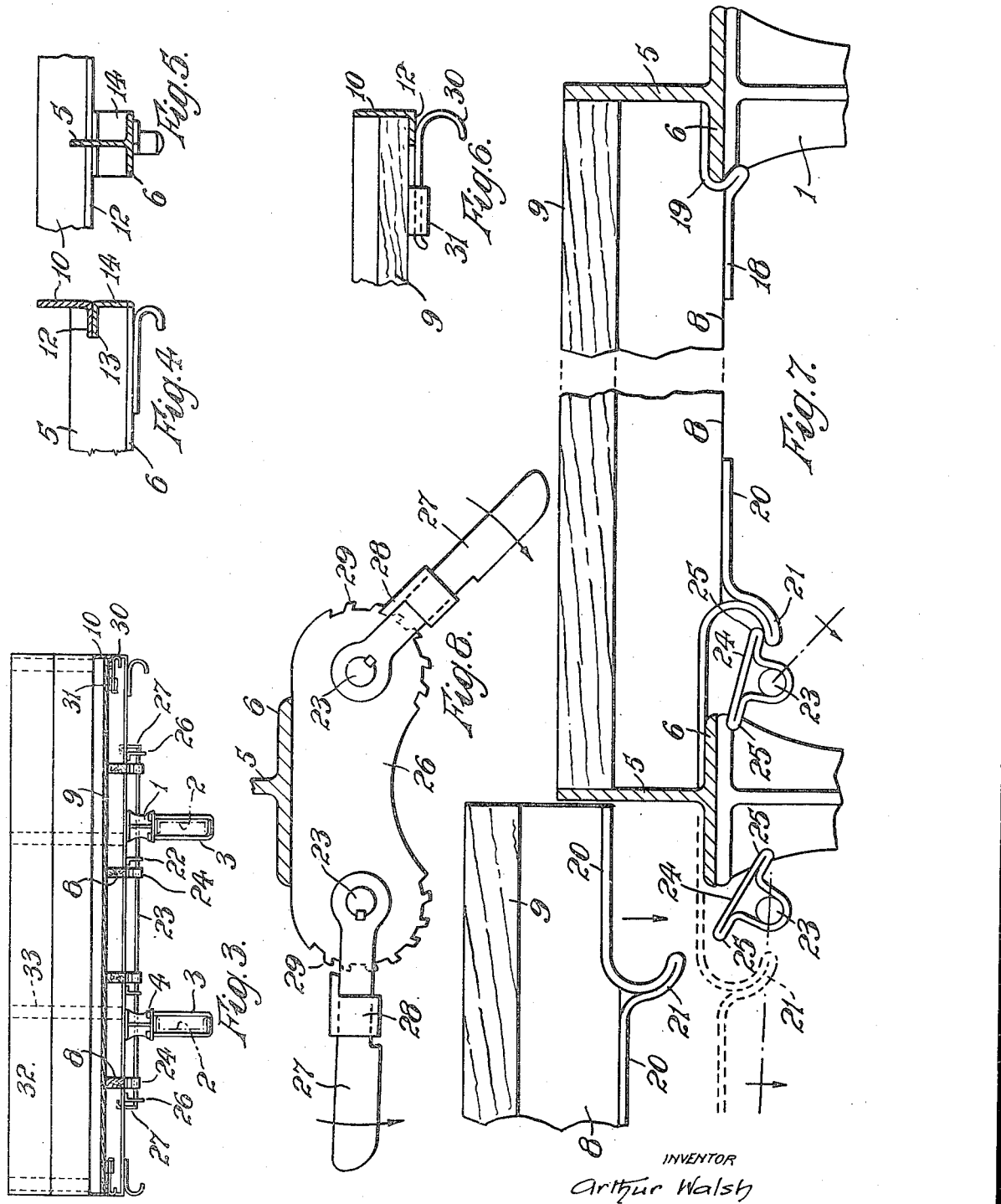

Patented Jan. 24, 1950

2,495,557

UNITED STATES PATENT OFFICE 2,495,557

FLOOR CONSTRUCTION OF ROAD VEHICLES

Arthur Walsh, Prescot, England

Application October 2, 1947, Serial No. 777,454
In Great Britain November 15, 1946

2 Claims. (Cl. 296—28)

This invention relates to a construction of the flooring of road vehicles whereby greater accessibility is afforded for enabling the mechanism below the floor to be cleaned or otherwise attended to. The invention is particularly applicable to motor wagons, trailers or like road vehicles. In the present floor construction of such vehicles, bearing timbers are disposed extending fore and aft of the vehicle upon which are secured wooden cross pieces to which again the boards of the platform or floor of the vehicle are secured, such boards running longitudinally of the vehicle. Where difficulty is experienced in obtaining boards of the requisite length to extend the full length of such a vehicle, the present invention affords a construction whereby shorter timber lengths corresponding to the width of the vehicle may be used for the flooring.

According to this invention the flooring platform superstructure for a road vehicle comprises a flooring support frame detachably connectable to the longitudinal chassis girders of the vehicle, the frame being subdivided transversely of the vehicle into a series of spaces provided with ledges, a series of flooring sections adapted to fit detachably into the spaces and be independently removable therefrom, and means for releasably securing the flooring sections in position.

In the accompanying explanatory drawings:

Fig. 1 is a plan of a road vehicle platform in accordance with this invention with four detachable floor sections, showing one section removed.

Fig. 2 is a vertical section on the line 2—2, Fig. 1.

Fig. 3 is a transverse section on the line 3—3, Fig. 1.

Fig. 4 is a fragmentary detail side view partly in section showing the connection of a transverse T-iron to the surround angle iron of the flooring support frame of the vehicle, and Fig. 5 is an end view partly in section of the detail shown in Fig. 4.

Fig. 6 is a fragmentary detail showing one end of a floor section resting on the side angle iron of the support frame with a rope hook clip securing the end of the section.

Fig. 7 is a longitudinal fragmentary section on a large scale showing the means for securing the floor sections in position in the support frame, and Fig. 8 is a fragmentary view of the ratchet mechanism for locking the floor sections in place.

In the form of the invention illustrated the detachable platform of the vehicle comprises a support frame and independently removable floor sections, the support frame being constructed from a series of webbed chairs 1 resting upon the usual longitudinal chassis girders 2 of the road vehicle and detachably secured by means of U-shaped straps 3 passing beneath the girders and connected to the lower plates of the chairs by nuts 4 engaging the threaded upper ends of the straps. The chairs are preferably of cruciform section in plan and the looped straps obliquely disposed so that the securing nuts 4 will be located in opposite diagonal corners of the base of each chair. Resting upon the chairs 1 are several inverted T-section bars 5 extending transversely the full width of the vehicle and subdividing the support frame into several spaces, the lower flanges 6 of the bars being secured to the chairs beneath. These flanges 6 provide side ledges to the spaces for supporting a series of separately removable floor sections 7 fitting the spaces. The sections are constructed of battens 8 on to which floor boards 9 are secured as by nailing. The scetions are preferably so made that the floor boards 9, as shown in Figs. 1 and 2, run transversely of the vehicle, and are thus much shorter in length than the boards that would be required if fitted longitudinally of the vehicle, as usual. The support frame has a surround consisting of side angle irons 10 and front and rear angle irons 11, the side angle irons 10 having their horizontal flanges 12 entered in slots 13 in the vertical webs of the T-bars 5, as shown in Figs. 4 and 5, the flanges 12 resting upon the corresponding flanges of short support angle irons 14 also inserted into the slots of the T-bars, the supports 14 being welded to the bars. The rear end angle iron 11 rests upon a transverse channel-section bar 15, and the front angle iron 11 on webbed chairs 16, on the girders 2, the channel 15 and chairs 16 being secured to the chassis girders 2 by straps 17.

Each of the spaces into which the support frame is subdivided is surrounded by a ledge support, the flanges 6 of the T-bars 5 forming such supports for the battens 8 of the floor sections, while the flanges 12 of the side angle irons 10 form supports for the floor boards 9 of the sections. In orer that each such section may be independently removed, when required, releasable securing means is provided. For this purpose, the battens 8 are each provided at one end with a metal fitting 18 formed with a notch 19 for hooked engagement with the flange 6 of the T-bar 5, Figs. 1 and 7, and at the other end with a metal fitting 20 having a wide hook shaped projection 21. Rotatably mounted in brackets 22 secured beneath the T-bars 5 are light shafts 23 on which, in the region of the battens 8 are fitted catches 24, having ears 25 which are adapted, when the shafts 23 are turned, to move clear of the hook projections 21, as shown at the left of Fig. 7, and then permit a floor section to be lowered into the position indicated by dotted lines in that figure, or to be raised up. In order to position a floor section, its notched fittings 18 are first engaged with the flange edge of a T-bar 5, and the opposite side then lowered into position resting on the ledge 6 of the opposite T-bar, Fig. 7, the shaft 23 having been turned to move the catch 24 clear of the hook 21 and permit of this lowering, the shaft being then turned back to engage the catch with the hook 21 and secure the section in position.

Rotation of the shafts 23 to the releasing and locking positions is controlled by the mechanism shown in Fig. 8, the ends of the shafts 23 journalled in end brackets 26 being provided with handles 27 each having a pawl 28 slidable thereon adapted to engage, or be released from, ratchet teeth 29 cut in circular edges of the end brackets 26. The pawls 28 are preferably spring-controlled so that they tend to engage the ratchet teeth 29, as indicated at the right of Fig. 8, the handles 27 being moved up to disengage the catches 24 or moved down in the direction of the arrows, to engage them with the hooks 21, the pawl and ratchet teeth forming a lock effectively securing the floor sections in position, but in such manner that any section or sections may be released and removed. When a section is lowered into position with its battens 8 resting on the flanges of the T-bars 5, the floor boards 9 will rest on the higher flanges 12 of the angle irons 10, and in order to secure the floor sections at these ends, rope hooks 30, Fig. 6, are provided slidable in guides 31 secured beneath the floor boards 9 at both ends of each section. Such hooks 30 are pushed back in the guides 31 when the floor section is to be lowered into position, and are afterwards pulled out to the position shown in Fig. 6 to engage beneath the flange 12 of the side angle iron 10. If desired, such rope hooks may be spring-controlled and tend always to move out to the locking position shown, the resilient control enabling the section to be lowered into position, the curved end of the hook snapping past the flange 12 of the angle iron 10. Subsequently when the hook is engaged by the rope securing the load on the vehicle, the hook is securely held in its outward locking position.

The vertical loading board 32 at the end of the floor structure has its transverse timbers secured to vertical channel irons 33, the protruding feet of which are adapted to be detachably engaged into socket pieces 34 secured to the support frame. As the protruding ends of the channel irons pass down the sockets the lower edge of the loading board 32 ultimately rests on a short inturned ledge 35 formed on the front angle iron 11 of the support frame.

With a construction of vehicle platform as described, the whole superstructure may be removed from the chassis by disconnecting the straps 3, while the flooring is such that any one or all of the sections may be removed to give ready accessibility for cleaning or attending to any part of the mechanism beneath, which with the present permanent fixing of the flooring structure is difficult to clean properly, and as considerable dirt and foreign matter accumulate on the mechanism in the course of the rough usage to which such road vehicles are exposed, there is often such an accumulation of foreign matter thereon as to seriously affect the efficient working. To attempt to clean the mechanism beneath the floor structure while the floor is in situ necessitates the cleaner getting beneath the vehicle while the foreign matter is being dislodged. But with an arrangement as described, one or more of the flooring sections may be removed and the cleaner bring his hose pipe to bear on the mechanism from above.

Instead of the support frame being made of metal it may be made of wood, the T-bars of the metal construction being replaced by transversely disposed wood beams detachably secured by U-shaped straps to the chassis girders, and the floor boards of each floor section may run longitudinally of the vehicle, thus enabling still shorter lengths of board to be utilized.

What I claim is:

1. A floor platform superstructure for a road vehicle comprising an L-section surround, a plurality of inverted T-section bars secured transversely to said surround and dividing the area enclosed thereby into a plurality of spaces extending the full width of said area, a flooring section for each space adapted to fit into said space and to rest on the flanges of said L and T-section members, a notched member on one side of each floor section arranged to engage one of said flanges, a hooked member on the opposite side of each floor section, and a catch rotatable to engage said hooked member.

2. In a flooring platform superstructure as claimed in claim 1, pawl and ratchet locking means normally locking the catch against rotation.

ARTHUR WALSH.

REFERENCES CITED

The following references are of record in the file of this patent:

UNITED STATES PATENTS

| Number | Name | Date |
|---|---|---|
| 432,343 | Tuthill | July 15, 1890 |
| 1,244,807 | Weisbrod | Oct. 30, 1917 |
| 1,443,818 | Gillespie | Jan. 30, 1923 |
| 1,867,433 | Young | July 12, 1932 |
| 1,870,418 | Mayer | Aug. 9, 1932 |
| 2,100,323 | Fitch | Nov. 30, 1937 |
| 2,307,149 | Milz et al. | Jan. 5, 1943 |

FOREIGN PATENTS

| Number | Country | Date |
|---|---|---|
| 579,314 | France | July 30, 1924 |